United States Patent [19]

Allison et al.

[11] Patent Number: 4,904,907
[45] Date of Patent: Feb. 27, 1990

[54] BALLAST CIRCUIT FOR METAL HALIDE LAMP

[75] Inventors: Joseph M. Allison, Euclid; Richard L. Hansler, Pepper Pike; Park French, Aurora; John M. Davenport, Lyndhurst; Robert A. Leskovec, Richmond Heights, all of Ohio

[73] Assignee: General Electric Company, Schenectady, N.Y.

[21] Appl. No.: 161,058

[22] Filed: Feb. 26, 1988

[51] Int. Cl.[4] .................................... H05B 41/36
[52] U.S. Cl. ........................ 315/307; 315/290 T; 315/226; 315/310; 315/DIG. 7
[58] Field of Search ......... 315/291, 307, 310, DIG. 7, 315/209 R, 209 T, 226

[56] References Cited

U.S. PATENT DOCUMENTS

| | | | |
|---|---|---|---|
| 4,042,856 | 8/1977 | Steigerwald | 315/246 |
| 4,170,746 | 10/1979 | Davenport | 315/246 |
| 4,350,930 | 9/1982 | Peil et al. | 315/49 |
| 4,373,146 | 2/1983 | Bonazoli et al. | 315/209 R |

FOREIGN PATENT DOCUMENTS

| | | |
|---|---|---|
| 0066754 | 12/1982 | European Pat. Off. . |
| 0091724 | 10/1983 | European Pat. Off. . |
| 0094137 | 11/1983 | European Pat. Off. . |
| 1575834 | 10/1980 | United Kingdom . |
| 2045554 | 10/1980 | United Kingdom . |
| 2068656 | 8/1981 | United Kingdom . |
| 8606572 | 11/1986 | World Int. Prop. O. . |

*Primary Examiner*—David Mis
*Attorney, Agent, or Firm*—John P. McMahon; Stanley C. Corwin; Fred Jacob

[57] ABSTRACT

A ballast circuit and method of operating gas discharge lamps are disclosed. The ballast circuit generates a relatively low frequency regulated square-wave current which advantageously provides for operating the gas discharge lamps during their run mode. The square-wave current delivered to the electrodes of the gas discharge lamp reduces or substantially eliminates the cataphoresis effects typically created by D.C. and 60 Hz operation of the gas discharge lamp while also reducing or substantially eliminating the detrimental acoustics resonance effects typically created by operating the gas discharge lamps at relatively high frequency of excitations.

16 Claims, 9 Drawing Sheets

BALLAST CIRCUIT FOR METAL HALIDE LAMP

CROSS REFERENCE TO RELATED APPLICATIONS

U, S. patent applications Ser. Nos. 157,359; 157,360; and 157,436 filed Feb. 18, 1988, respectively for "Xenon Lamp Particularly Suited For Automotive Applications", of Davenport and Hansler; "Metal Halide Lamp Having Vacuum Shroud For Reducing Cataphoretic Effects" of Hansler, French and Davenport and "Xenon-Metal Halide Lamp Particularly Suited For Automotive Applications" of Bergman, Davenport, and Hansler all assigned to the same assignee as the present invention, are all related to the present invention.

BACKGROUND OF THE INVENTION

The invention relates to a ballast circuit and method of operating metal halide and xenon-metal halide lamps to reduce or substantially eliminate the detrimental cataphoresis and acoustic resonance effects typically experienced during such metal halide operation.

As disclosed in the cross reference U.S. applications Ser. Nos. 157,359; 157,360; and 157,436, it is desired to provide discharge lamps for automobiles so as to allow the automotive designers to lower the hood lines of the automobile in order to improve the appearance and also the aerodynamic performance of the automobile. As further disclosed in application Ser. No. 157,360, metal halide lamps when operated from an alternating current (A.C.) source such as 60 Hz or from a D.C. source typically experience the effects of cataphoresis which cause the halide of the metal halide lamps to be moved or swept into the end regions of the lamp so as not to contribute to providing the desired illumination of such a lamp. U.S. application Ser. No. 157,360, discloses the use of a vacuum shroud to eliminate the cataphoresis effects associated with the metal halide and xenon-metal halide lamps. While such a vacuum shroud serves its desired purpose, it is desired to eliminate such cataphoresis effects without the need of a vacuum shroud thereby reducing the fabrication costs of such metal halide and xenon-metal halide lamps.

The cataphoresis effects of operating low wattage metal halide lamps are noticeable for a frequency of operation of up to about 1KHz but may be compensated for by supplying excitation to the low wattage metal halide lamps at a relatively high frequency. The high frequency operation, however, may lead to the creation of acoustic resonance effects which degrade the operation of such lamps. Such resonance effects are more fully disclosed in U.S. Pat. No. 4,170,746 of Davenport et al., herein incorporated by reference and to which reference may be made for further details of the detrimental acoustic resonance effects.

As disclosed in U.S. Pat. No. 4,042,856 of Steigerwald in column 4 lines 1-60 the acoustic resonance effects related to gaseous discharge lamps having an applied alternating current (A.C.) may be avoided by a frequency of operation between 10-40KHz associated with the ripple of the A.C. current applied to the lamp.

The cataphoretic transport of metal ions in low wattage gas discharge lamps of the metal halide type may also occur for the operation of such lamps with a direct current (D.C.) excitation. The detrimental cataphoretic transport of metal halide lamps occurring during D.C. operation is particularly noticed when the lamp is oriented in a vertical manner during its operation. The vertical operation provides a gravitational effect drawing or displacing the metal halides from the desired central portion of the lamp and into its end region so as to hinder the desired metal halide ingredients from contributing to the desired illumination of such lamps. It is desired that means be provided to allow for any orientation of the metal halide lamps so as to create a freedom for the automotive designers and lamp fixture designer to position or orient the metal halide lamp in accordance with their particular needs.

Accordingly, it is an object of the present invention to provide for a method of operating gas discharge lamps without the need of a vacuum shroud while at the same time reducing or substantially eliminating the cataphoresis and acoustic resonance effects on the gas discharge lamps and allowing for any desired orientation of these lamps.

It is a further object of the present invention to provide for a ballast circuit that allows for the desired method of operating the gas discharge lamps.

It is a further object of the present invention to provide a method and a ballast circuit for operating various discharge lamps such as a xenon lamp, a metal halide lamp and a xenon-metal halide lamp described in cross referenced related applications have Ser. Nos. 157,359; 157,360; and 157,436 respectively.

SUMMARY OF THE INVENTION

The present invention is directed to a ballast circuit and a method of operating gas discharge lamps so as to reduce or substantially eliminate the detrimental cataphoresis and acoustic resonance effects typically experienced therewith.

The method of operating the gas discharge lamps comprises the steps of applying a relatively high voltage across the pair of electrodes of the gas discharge lamp to cause the excitation of the ingredients contained within the lamp, and then delivering a regulated square-wave current having a relatively low frequency to the pair of electrodes of the lamp to maintain the excitation of the gas discharge lamp. It is further desired that the method alternately change the direction in which the square-wave current is delivered to the electrodes on a periodic basis.

The ballast circuit comprises a D.C. to D.C. switching current regulator adapted to be connected to a source of D.C. excitation and responsive to (1) means for generating a control signal, and (2) means for establishing and detecting the level of current flowing through the gas discharge lamp. The D.C. to D.C. current regulator is periodically rendered conductive in response to the control signal so as to periodically generate a D.C. regulated square-wave current. The D.C. to D.C. current regulator is rendered non-conductive in response to predetermined values of the level of current flowing in the gas discharge lamp. The ballast circuit further comprises bridge means connected between the D.C. to D.C. switching current regulator and the gas discharge lamp. The bridge means is responsive to the means for generating the control signals so as to steer the regulated current of the D.C. to D.C. switching current regulator in alternate directions through the gas discharge lamp.

It is preferred that the ballast circuit also include a starting means coupled across the gas discharge lamp and generating a periodically occurring relatively high voltage pulse to initiate and establish the arc condition of the gas discharge lamp.

DETAILED DESCRIPTION OF THE PREFERRED EMBODIMENTS

Figure 1:
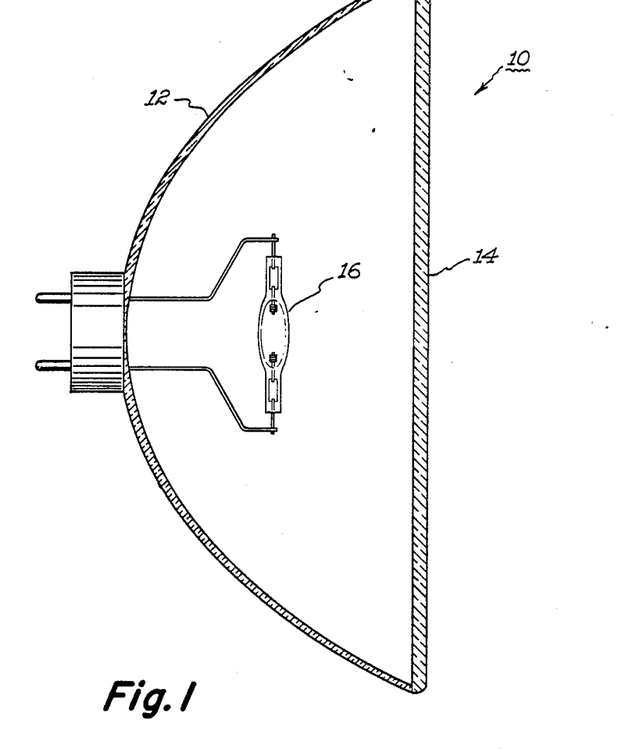
FIG. 1 illustrates one embodiment for operating a gas discharge lamp in a headlamp that is particularly suitable for automotive applications.

In one embodiment of the present invention a ballast circuit and a method is provided for operating an automotive headlamp 10 shown in FIG. 1 comprising a reflector 12, a lens 14 and a light source 16. The light source 16 may be of various types each containing excitable ingredients such as described in the cross-referenced U.S. patent applications Ser. Nos. 157,359; 157,360; and 157,436 and to which reference may be made for further details of the automotive lamp 10 and the various light sources.

As discussed in the "Background" section, a gas discharge lamp such as a metal halide light source, without the benefits of the present invention, may typically experience cataphoresis effects when operated from a relatively low frequency alternating current (A.C.) source such as 60 Hz or from direct current (D.C.) excitation. Similarly, the metal halide light source may typically experience detrimental acoustic resonant effects when operated at a relatively high frequency such as 30KHz.

In our pursuit to find a solution for such detrimental operations, certain observations and subsequent analysis of the behavior of small horizontally oriented metal halide lamps were made to further improve our understanding of the role of cataphoresis on the A.C. and D.C. operations of the metal halide lamp. A consequence of our improved understanding has been the development of a means for controlling the radiating metal contents of the arc within the metal halide lamps relative to the frequency of operation of these lamps.

One of the significant observations that was made related to the small metal halide lamps, such as a light source 16 previously mentioned, was that these lamps showed distinctively higher efficacies and lower color temperature when operated at a frequency of several kilohertz and above as opposed to the operation of the metal halide lamps at the low frequency such as 60 Hz. This observation indicated that substantially higher radiating metal densities in the arc occurred during such high frequency operations. This indication was substantiated by observing the operation of the metal halide lamp through filters that selectively allowed viewing of the transmitted light that was produced by the excited sodium ingredient within the lamp. It was further observed that the low frequency of operation of the lamp could be followed by a video recorder and that the sodium ingredient contributing to the arc of the metal halide lamp had the appearance of a cloud attached to the connector or electrode of the lamp which had a fairly sharp boundary at the anode and which moved toward the cathode during each half of the A.C. operation of the lamp. An additional observation was that the condensed halides tended to deposit in the end regions or chambers of the metal halide light source at the lower frequencies of operation, whereas, at the higher frequencies of operation the condensates accumulated primarily in the lower central region of the metal halide light source tube. Both of these movements placed a halide ingredient out of its desired central location between the electrodes and thereby retarded the contribution of the halide ingredients to the desired illumination output of the metal halide lamp.

From our observations, analysis, and further experimentation to correct for the detrimental operation of the metal halide lamp, we have determined a desired method for operating the lamp that reduces or substantially eliminates the detrimental cataphoresis and acoustic resonant effects of the operation of the metal halide lamp. In pursuit of our desired method of operating such metal halide lamp we have determined the operational parameters and arrangement for a ballast circuit which allows for our desired operation of the discharge lamps such as discussed in the cross-referenced U.S. patent applications Ser. Nos. 157,359; 157,360 and 157,436.

The present invention provides a ballast circuit and a method of operating various types of discharge lamps such as halide lamps along with xenon lamps. In general, the ballast circuit causes the initial or starting ionization phase of the related discharge lamps to be established by the application of relatively high voltage pulses and then is excited with a regulated square-wave current excitation during its run or operative mode. The ballast circuit provides for such excitations. The ballast circuit generates a relatively low frequency square-wave regulated current which advantageously operates the metal halide lamp during its run mode with such current being delivered to the electrodes so as to reduce or substantially eliminate the cataphoresis effects typically created by not only 60 Hz operation but also D.C. operation of the lamp. This square wave current excitation also reduces or substantially eliminates the detrimental acoustic resonant effects typically created by the relatively high frequency operation of the discharge lamp.

The method of the present invention related to operating the light source 16 comprises the steps of applying a relatively high voltage across the pair of electrodes to cause the initial excitation of the ingredients in the gas discharge lamps. After such excitation the present invention delivers a square-wave current having a relatively low frequency to the pair of electrodes to maintain the excitation condition of the gas discharge lamps. Further, it is preferred that the present method alternately change, on a periodic basis, the direction to which the square-wave current excitation is delivered to the electrodes. The square-wave current is of an amount in the range of about 0.2 amperes to about 2.0 amperes and a repetition rate of about 1.0 millisecond to about 0.1 millisecond. It is preferred that the relatively high voltage to establish or start the excitation of the ingredients of the gas discharge lamps be of a A.C. voltage having an amplitude in the range of about 20,000 volts and a frequency of about 5KHz.

In general, the ballast circuit of the present invention for operating the metal halide lamp comprises a D.C. to D.C. switching current regulator adapted to be connected a source of D.C. excitation and responsive to (1) means for generating a periodically occurring control signal, and (2) means for establishing and detecting the level of current flowing in the gas discharge lamp. The D.C. to D.C. current regulator is periodically rendered conductive in response to the periodically occurring control signal so as generate a square-wave regulated current having the parameters previously discussed. The D.C. to D.C. current regulator is rendered non-conductive in response to a predetermined level of the current flowing in the gas discharge lamp. The ballast circuit further comprises bridge means connected between the regulated current of the D.C. to D.C. switching regulator and the gas discharge lamp. The bridge means is responsive to the means for generating the periodically occurring control signal so as to steer the regulated current of the D.C. to D.C. switching regulator in alternate directions through the gas discharge lamp. It is further desired that the ballast circuit further comprise starting means coupled across the gas discharge lamp and generating the periodically occurring relatively high voltage pulse having the parameters previously given so as to initiate the excitation of the ingredients within the gas discharge lamp 16.

Figure 2:
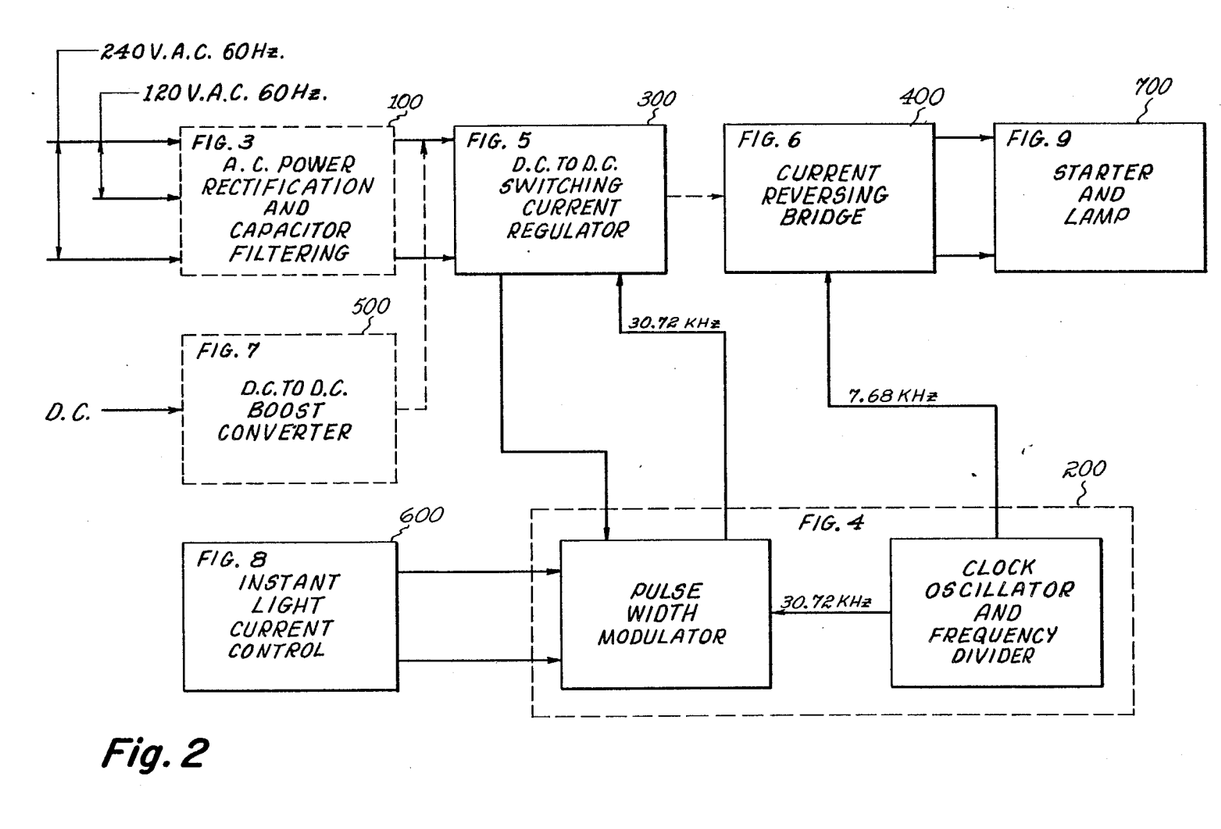
FIG. 2 is a block diagram showing the interrelationship of the ballast circuit of the present invention.
Figure 3:
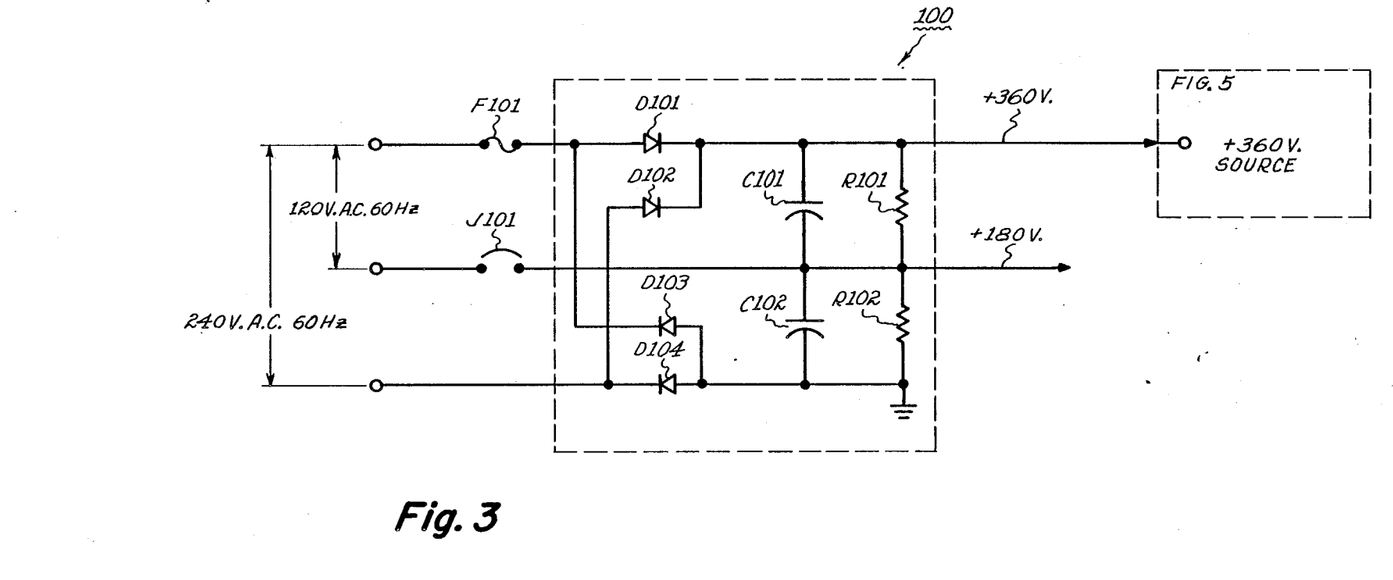
FIG. 3 is a diagram showing the A.C. power rectification and capacitor filtering circuit arrangement of the present invention.
Figure 4:
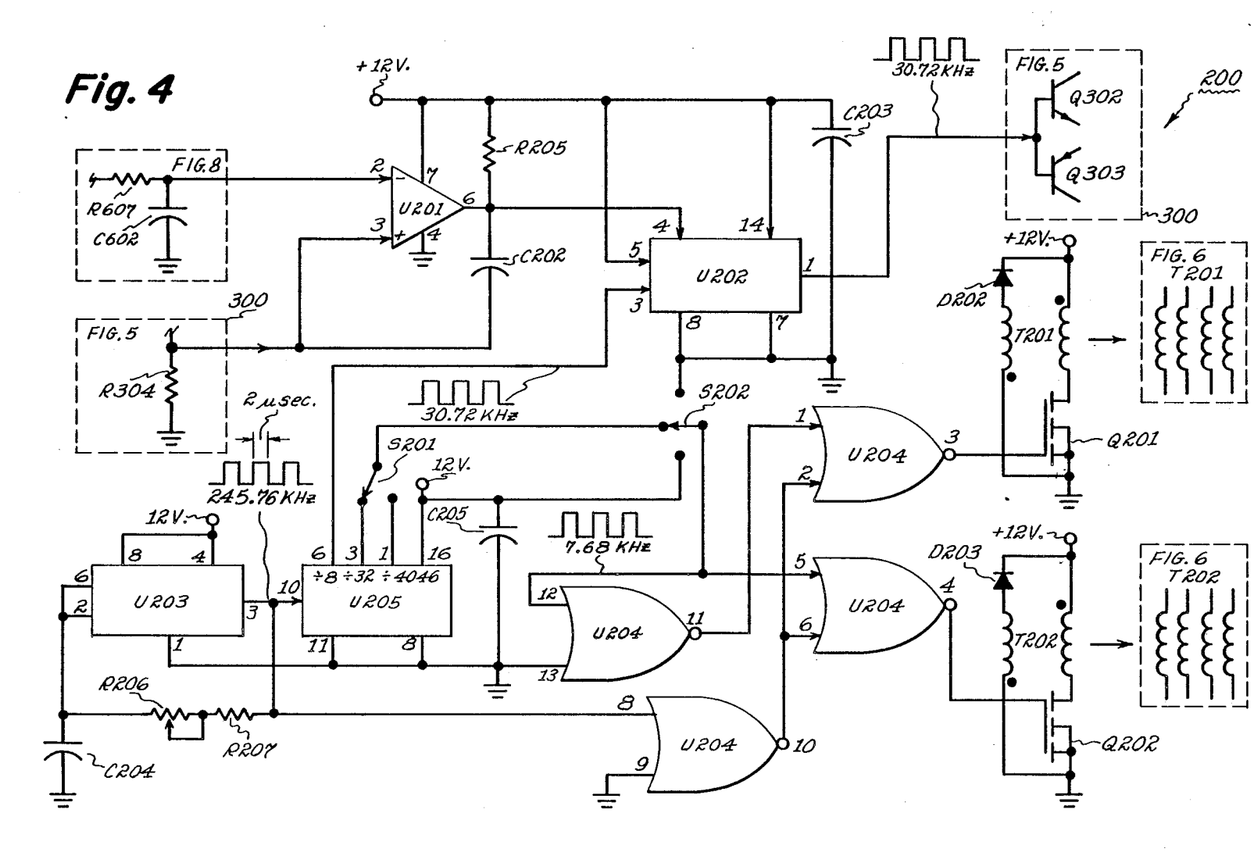
FIG. 4 shows a diagram of the pulse width modulator, clock oscillator and frequency divider of the present invention.
Figure 5:
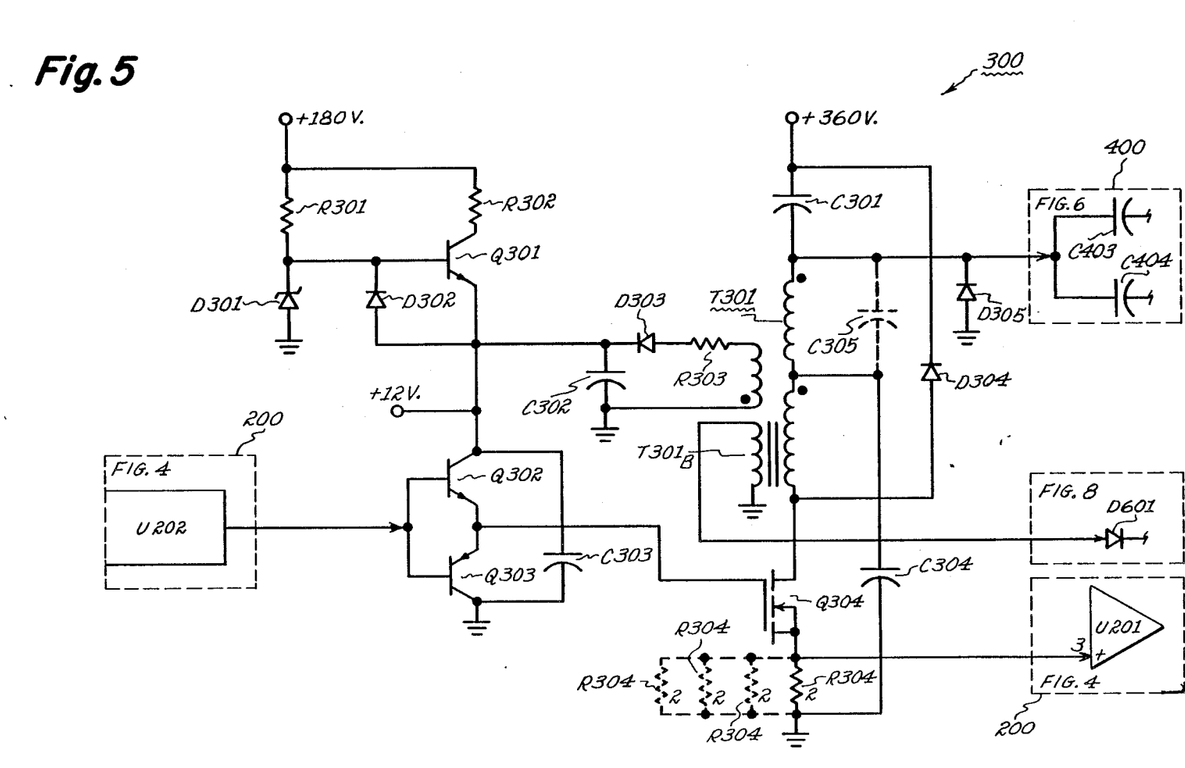
FIG. 5 is a diagram of the D.C. to D.C. switching current regulator of the present invention.
Figure 6:
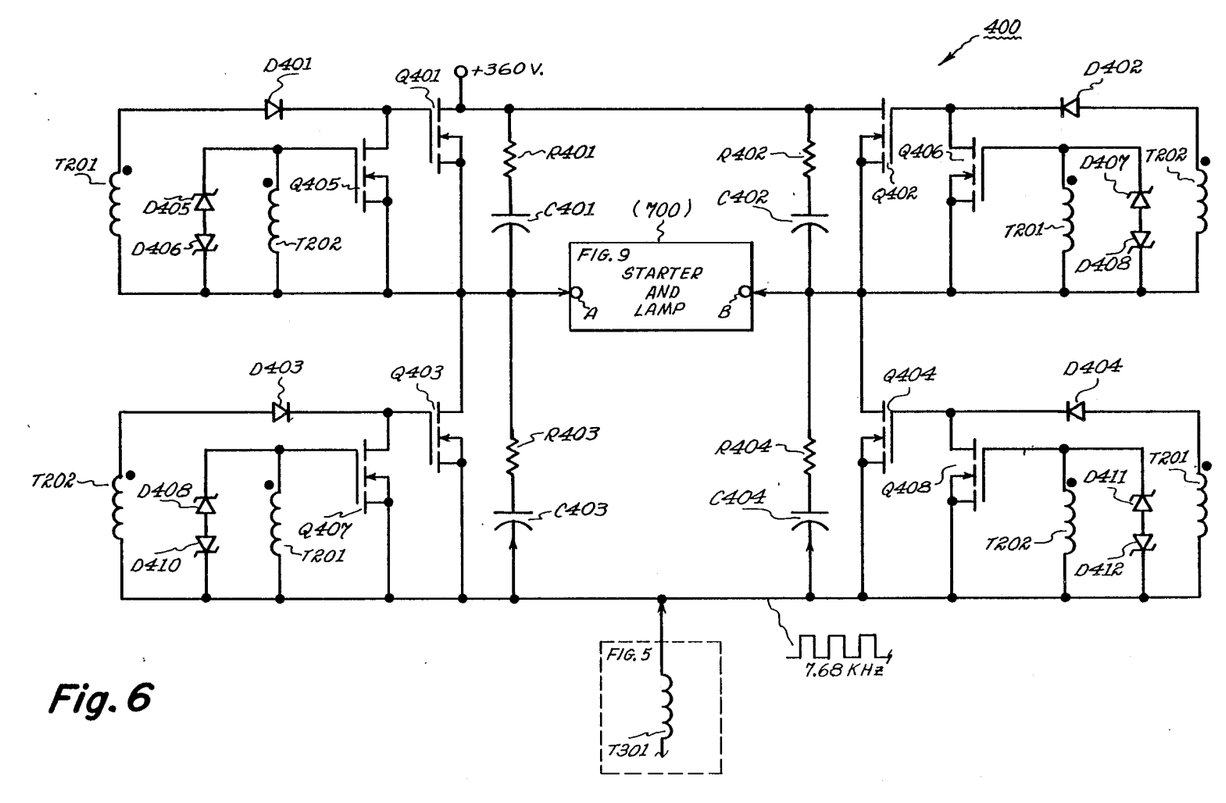
FIG. 6 is a diagram showing the current reversing bridge of the present invention.
Figure 7:
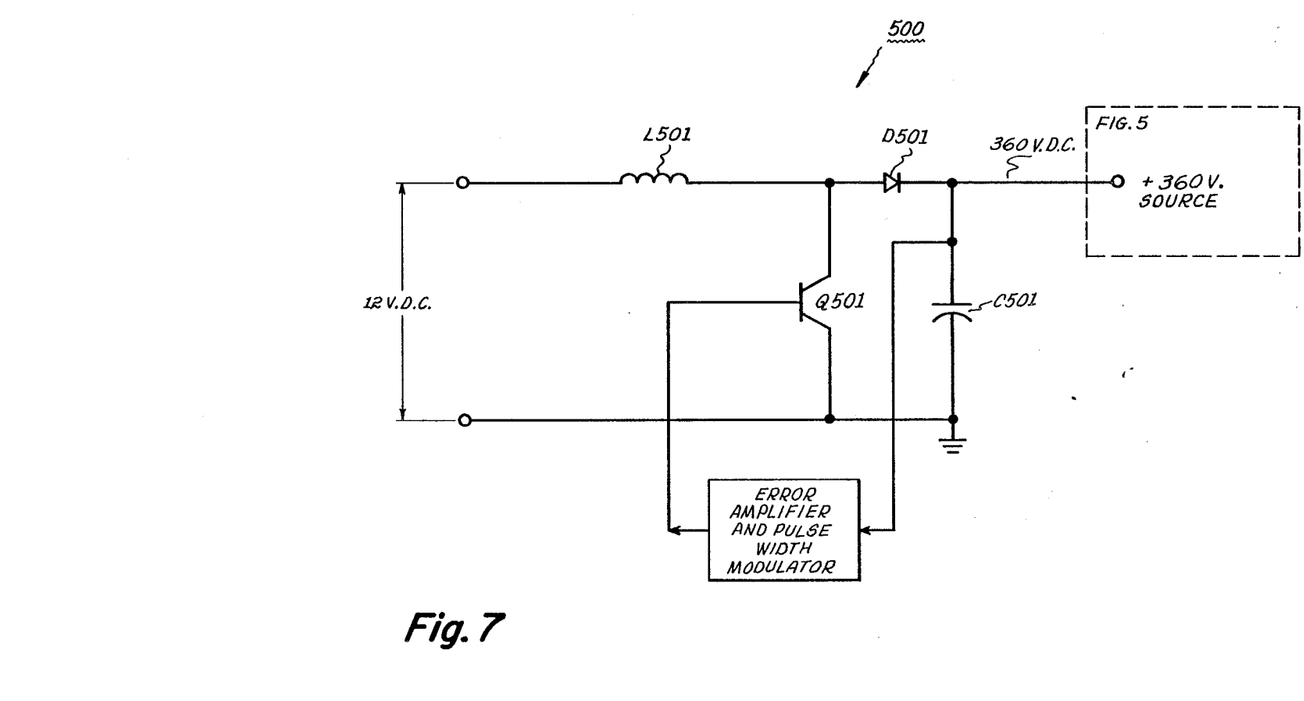
FIG. 7 illustrates a D.C. to D.C. boost converter related to the present invention.
Figure 8:
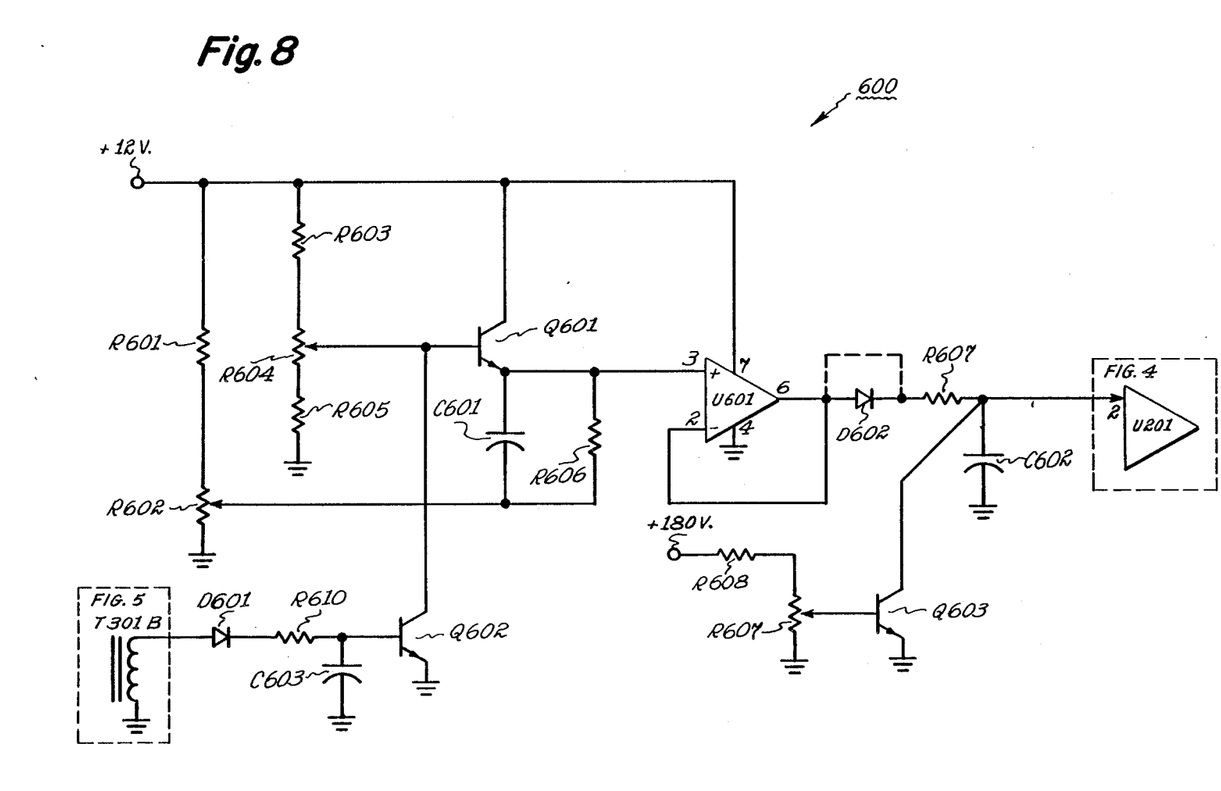
FIG. 8 is a diagram showing the instant light current control circuit arrangement of the present invention.

A block diagram of the ballast circuit of the present invention is illustrated in FIG. 2 showing the interconnections of a A.C. power rectification and capacitor filter 100 of FIG. 3, pulse width modulator, clock oscillator and frequency divider 200 of FIG. 4, a D.C. to D.C. switching current regulator 300 of FIG. 5, a current reversing bridge 400 of FIG. 6, a D.C. to D.C. boost converter 500 of FIG. 7, and instant light current control 600 of FIG. 8, and a starter 700 for xenon, xenon-metal halide and metal halide lamps. FIGS. 3, 4, 5, 6, 7, 8 and 9 respectively indicate their circuit components with reference numbers 100, 200, 300, 400, 500, 600 and 700. The circuit components of FIGS. 3-9 are of a designation and/or of a type as given in Table 1.

TABLE 1

| DESIGNATOR | DESCRIPTION |
| --- | --- |
| | TRANSISTORS |
| Q201-Q202 | IRFD1ZO, MOSFET, N-CHANNEL |
| Q301 | MJE 13004, NPN |
| Q302 | 2N2222, NPN |
| Q303 | 2N2907, PNP |
| Q304 | IRF 830, HEXFET, N-CHANNEL |
| Q401-Q404 | RCP 10N40, COMFET |
| Q405-Q408 | IRF DIZO, MOSFET, N-CHANNEL |
| Q501 | IRF 830, HEXFET, N-CHANNEL |
| Q601 and Q602 | 2N3568 |
| Q603 | 2N3638 |
| Q701 | MJE 13007 |
| Q702 | 2N6517 |
| | RESISTORS |
| R101-R102 | 47K, 1 W |
| R203-R204, R205 R207 | 4.7K, ¼ W, 5% |
| R202 | 50K POTENTIOMETER, 5% |
| R206 | 10K POTENTIOMETER, 5% |
| R301 | 120K, ¼ W, 5% |
| R302 | 6.8K, 3 W, 5% |

TABLE 1-continued

| DESIGNATOR | DESCRIPTION |
| --- | --- |
| R303 | 220, ¼ W, 5% |
| R304 | 2, ¼ W, 5% |
| R401-R404 | 22, ¼ W, 5% |
| R601 | 10K |
| R602 | 1K POTENTIOMETER |
| R603 | 3.9K |
| R604 | 1K |
| R605 | 2K |
| R607 | 10K |
| R608 | 120K 0.5 WATTS |
| R609 | 10K |
| R610 | 10K |
| R701 | 75 Ω 10 WATTS |
| R702 | 4K 10 WATTS |
| R703 | 4K 10 WATTS |
| R704 | 390K |
| R705 | 1K |
| R706 | 2 Ω 2 WATTS |
| | SWITCHES |
| S201 | |
| S202 | |
| | CAPACITORS |
| C010-C102 | 1000 UF, 200 VDC, ELECTROLYTIC |
| C202 | 5 pF, 50 VDC, DISC |
| C203, C205 | 0.1 UF, 50 VDC, DISC |
| C301 | 0.01 microfarads, 1KV DISC |
| C302 | 1 microfarads, 35 V ELECTROLYTIC |
| C303 | 0.1 microfarads |
| C304 | 0.033 microfarads, 630 V, FILM |
| C305 | 0.01 microfarads, 1KV, DISC |
| C401-C404 | 0.001 microfarads, 1KV, DISC |
| | 0.003 microfarads, 1KV, DISC |
| C501 | 47 microfarads, 475 V |
| C601 | 2 microfarads |
| C602 | 0.47 microfarads |
| C603 | 0.47 microfarads |
| C701 | |
| C702 | |
| C703 | 0.0056 microfarads |
| C704 | 0.1 microfarads |
| C705 | 0.001 microfarads |
| C706 | 0.002 microfarads |
| C707 | 0.002 microfarads |
| | DIODES |
| D101-D104 | IN4004, 1A, 400PIV |
| D202-D203 | IN4148 |
| D301 | 10V,K ¼ W, ZENER |
| D302 | IN4004, 1A, 400PIV |
| D303 | UES 1106 |
| D304-D305 | UES 1106 |
| D401-D404 | UES 1106 |
| D405-D412 | 15V, ¼ W, ZENER |
| D501 | |
| D601 and D602 | IN4148 |
| D701 | IN4004, 1A, 400PIV |
| D702 | IN4004, 1A, 400PIV |
| D703 | IN4148 |
| D704 | TV High Voltage Focus Rectifier |
| | FUSES |
| F101 | 1A, 250V |
| | TRANSFORMERS |
| T201-T202 | 17TURNS #30 WIRE (6 WINDINGS) TOROID-266CT 125-3B7, FERROXCUBE |
| T301 | GE PART NO 24A521737 WITH 110 TURNS, #30 WIRE ADDED FOR LOW VOLTAGE WINDING *HIGH WATTAGE DESING 2.2 mh N68TURNS, 0.84 GAP, #21 WIRE LOW VOLTAGE WINDING 35 TURNS, #21 WIRE |
| | VARISTOR |
| VR701 | V130 LA 10 A |
| | IC'S |
| U201 | TL 331 COMPARATOR |
| U202 | 4013B, DUAL D FLIP-FLOP, |
| U203 | ICM 7555 TIMER |
| U204 | 4001B, QUAD 2-IN NOR GATE |
| U205 | 4040B, 12 STAGE BINARY COUNTER |

TABLE 1-continued

| DESIGNATOR | DESCRIPTION |
| --- | --- |
| U601 | COMPARATOR |

In one embodiment, the present invention related to the use of gas discharge lamps for commerical or industrial applications preferably comprises the A.C. power rectification and capacitor filtering 100 which is adapted to be connected to a first and a second A.C. source having respective typical values of 120 volts at 60 Hz and 220 volts at 60 Hz. The power rectifier 100 comprises a full wave bridge which is comprised of diodes D101, D102, D103 and D104 and develops a first and second D.C. voltage having respective values of about 180 volts and about 360 volts. It is preferred that the A.C. power rectification and capacitor 100 form part of the present invention but other means such as an external source that supplies the developed 180 V and 360 V may be practiced by the present invention. Further, it is preferred that filtering of the developed first and second D.C. voltages be accomplished by a resistor capacitor network such as that formed by C101 and R101 and C102 and R102 respectively connected across the first and second developed D.C. voltages.

In another embodiment for vehicle or automotive applications, the +360 V D.C. may be developed by a conventional D.C. to D.C. boost converter 500 shown in FIG. 7 having as an input a 12 V D.C. excitation from a typical automotive battery. The elements L501, D501, C501 and Q501 of FIG. 7 operate in manner as described in Section 9.5 of the text *Switching and Linear Power Supply, Power Converter Design* of Abraham/-Pressman published by Hayden Book Company, Inc., Rochelle Park, N.J. and Copyrighted in 1977, whereas, the error amplifier and pulse width modulator of FIG. 7 which may be a integrated circuit of Silicon General SC1524 operate in a manner as described in Section 9.6 of the same text.

For all of these embodiment all that is necessary is that a D.C. excitation be supplied to the D.C. to D.C. switching current regulator 300 of FIG. 5. For the embodiment shown in FIG. 2 the first and second D.C. voltages developed by the rectifier 100 are connected to the D.C. to D.C. switching current regulator 300 of FIG. 5. The D.C. to D.C. switching current regulator 300 is connected in series with the current reversing bridge 400 and provides a square-wave of regulated current, to be described, which is delivered to the discharge lamp related to the present invention. The D.C. to D.C. current regulator provides a constant current source and delivers this constant current to the lamp by way of the bridge 400. The bridge functions to steer the constant current developed by the D.C. to D.C. current regulator in alternate directions through the discharge lamps. For one embodiment of the present invention, the frequency of the reversals of the constant current supplied to the lamp from bridge 400 is preferably 7.68KHz and is determined by the full-duty square wave control waveforms generated by the clock oscillator and frequency divider of FIG. 4. The D.C. to D.C. switching current regulator of FIG. 5 responds to a 30.72KHz signal generated by the clock oscillator and frequency divider of FIG. 4 and is also controlled by the pulse width modulator (PWM) logic of FIG. 4 which responds to the lamp current feedback developed by the D.C. to D.C. current regulator 300 and the desired and actual lamp current conditions determined by the instant light current control circuitry 600 of FIG. 8. The circuit arrangement of FIG. 4 to be described has a high degree of filtering so as to reduce the ripple associated with the 30.72KHz signal to less than 3% peak to peak so that the regulated current eventually delivered to the lamp is preferably a 7.68KHz squarewave of a high quality.

The D.C. to D.C. switching current regulator of FIG. 5 is responsive, in part, to means for generating a periodically occurring control signal at the output of U202, shown in FIG. 4 and also shown as an input in FIG. 5, which, in turn, is applied to the base of switching means comprised of transformers Q302 and Q303 as shown in FIG. 5. The transistors Q302 and Q304 generates an output signal representative of the periodically occurring control signal of U202 that is applied to a transistor Q304. The transistor Q304 is a main power control switch which is preferably a power field effect transistor (FET). A plurality of resistors R304 (such as four), are arranged in series with the source of Q304 as a current measuring shunt that supplies lamp current feedback, shown at the output of FIG. 5, that i applied to pin 3 of U201 of the feedback control of FIG. 4. The resistors R304 of FIG. 5 serves to provide a means for detecting the current flowing through the transistor Q304 in its conductive state, which, in turn, is indicative of the current flowing through the gas discharge lamp.

The transistor means Q304 of FIG. 5 is connected to one end of a two inductor Tee-series filter having its other end connected to the 360 D.C. voltage by means of capacitor C301. The transistor Q304 is rendered conductive in response to the output signal of the switching means Q302 and Q304 and generates a regulated constant current source of a D.C. square-wave, shown as being routed to C403 and C404 of FIG. 6, that is eventually delivered to the discharge lamp by means of the bridge 400 of FIG. 6. It is preferred that a capacitor C304 be connected in parallel one of the windings of T301, as shown in FIG. 5, so as to form a capacitor/inductive combination that develops a wave trap with a transfer notch at a fundamental frequency of the D.C. to D.C. switching current regulator. The capacitor/inductor combination is of particular importance to the present invention in that it results in providing a very low ripple current that is supplied to the discharge lamp which advantageously assists in allowing the arc formed between the electrodes not to experience any arc bending typically created by acoustic resonance, (discussed in "Background" section) in the chamber of the discharge lamp. The Tee-filter network of FIG. 5 is selected to have a sharp response that enables the current supplied to the lamp to be ramped-up in time fast enough, such as less than 1.0 millisecond, to ensure consistent lamp starting to be described in hereinafter with regard to FIG. 9. The desired transient response of such a Tee-filter network is accomplished by the selection of the component values given in Table 1 for T301, T302, C304, and C305.

A network comprised of resistor R303, diode D303 capacitor C302 is connected across a control winding included in the core of the input inductor T301 and in series with a diode D302 which is connected to the base of a transistor Q301 having its collector connected to the 180 V D.C. voltage by means of resistor R302. This network supplies the 12 V D.C. low voltage logic power used for the electronic elements of the ballast circuit after the discharge lamp related to the present invention warms up. This network also removes a portion of 180 volt excitation from the transistors Q302 and Q303 by biasing transistor Q301 so as to be rendered non-conductive. Prior to the lamp warm up, the D.C. logic is supplied from the rectified power 180 V D.C. input to FIG. 5 through transistor Q301. If desired through appropriate selection of resistance values for R301 and R303, the 360 volt excitation may be used in lieu of the 180 volt to develop the 12 V D.C. logic power. Further, this alternate 360 volt excitation may be derived from either the A.C. Power Rectification 100 of FIG. 1 or the D.C. to D.C. Boost Converter 500 of FIG. 8.

The current reversing bridge 400 of FIG. 6 is comprised of four transistors Q401–Q404 which are controlled, in part, by pulse transformers T201 and T202 of the current arrangement 200 of FIG. 4. The bridge 400 is operated in one of two states, each state corresponding to the direction of the regulated current that is delivered to the lamp. In one of the states, transistors Q401 and Q404, which operate as a diagonally opposed bridge pair, are fully turned on while the other bridge transistors Q402 and Q403 are rendered non-conductive. In the other bridge state, the previously turned off transistors are rendered conductive while the previously conductive transistors are rendered non-conductive. With reference to FIG. 4, the transformers T201 and T202, each having four isolated secondary windings, are never pulsed simultaneously since each transformer determines a bridge state when driven by the logic arrangement of FIG. 4. In order to establish each of the states of the bridge 400 of FIG. 6, the pulse transformer T201 is pulsed by the logic arrangement of FIG. 4.

The first pair Q401 and Q404 of transistors of FIG. 6 along with their associated networks provide a pair of switching networks each of which is responsive to the output pulse developed by the pulse transformer network of FIG. 4 to be described. The conductive and non-conductive states of Q401, Q402, Q403 and Q404 determine the direction in which the regulated current developed by the D.C. to D.C. current regulator is routed through the gas discharge lamp. The first pair of switching networks Q401 and Q404 is rendered conductive in response to the pulsed output of FIG. 4 to steer the regulated current developed by the D.C. to D.C. current regulator 300, connected to the bridge 400 as shown in FIG. 6 as being applied via transformer T301 of FIG. 5, through the discharge lamp in a first direction. The second pair of switching networks related to transistors Q403 and Q402 are rendered conductive in response to the pulsed output of the circuit arrangement of FIG. 4 to steer the regulated current developed by the D.C. to D.C. current regulator 300 in the other direction through the discharge lamp.

To accomplish this function, two of the secondaries of T201, shown in FIG. 6, in response to the pulsing of FIG. 4 provide turn-on drive for diagonally opposed bridge transistors Q401 and Q404, so as to establish the first operating state of the full-bridge 400 while, the other two windings of the transformer T201 provide turn-off drive for the remaining bridge transistors Q402 and Q403. The second operating state of the bridge 400 is established by the current arrangement of FIG. 4 pulsing the other transformer to T202 of FIG. 4. Two of the secondaries of transformer T202 provide turn-on drive for diagonally opposing bridge transistors, Q402 and Q403, while, the other two windings of transformer T202 provide the turn-off drive for the remaining bridge transistors Q401 and Q404. During these two operating states there is no time during which all of the four main bridge transistors Q401 through Q404 are rendered non-conductive or rendered conductive. To turn-on (render conductive) a particular bridge transistor, the transformer coupled pulses generated by the circuit arrangement of FIG. 4 supplies the turn-on energy directly and the pulses are supplied continuously to the transistors for a duration of its intended on-state. The transistors (Q401–Q404) gate capacitance is the means relied upon to hold the transistor on during the brief duration such as two microseconds spaces between the pulses generated by the circuit arrangement of FIG. 4. To turn off a particular transistor (Q401–Q404), the transformer T201 or T202 delivers a pulse to the gate-source of the pilot transistor such as transistor Q405, Q406, Q407 or Q408 shown in FIG. 6. The related pilot transistor performs the actual turn-off of the related bridge transistor. Turn-off pulses generated by the circuit arrangement of FIG. 4 are supplied continuously during the intended off-state of the particular bridge transistors Q401–Q404. All bridge transistors therefore have their states continuously refreshed except for two microsecond spaces between the two microsecond pulses generated by the circuit arrangement of FIG. 4. The pulse transformers T201 and T202 shown in both FIGS. 4 and 6 are desired to have a voltage soaking capacity in the order of 20 volts-microseconds. This parameter allows for the magnetic cores of such transformers T201 and T202 to be relatively small.

The circuit arrangement of FIG. 4 which controls the operation of the bridge 400 also provides the timing means for synchronizing the operation of the ballast circuit of the present invention, by means of an arrangement of a clock oscillator and frequency divider. The pulses generated by the circuit arrangement of FIG. 4 that control the operation of the bridge 400 and that synchronize the operation of the ballast circuit are originated by U203 which is a CMOS version of a well known 555 free-running timer. The free running timing source generates an output signal at a predetermined frequency of about 245.76KHz and has a predetermined pulse width of about 2 microseconds. The output of U203 is applied to routing means U205 which generates (divides by 8) and directs a 30.72KHz pulse train to a device such as a flip-flop U202. As will be explained hereinafter, the application of this 30.72KHz signal, in turn, generates the periodic occurring control signal of 30.72KHz to the D.C. to D.C. current regulator 300 in response to the absence of an output signal provided by a comparator means U201 that is indicative of the current flowing through the gas discharge lamp related to the present invention. If desired, but not preferred, the output of the free running timer U203 may develop the desired 30.72KHz signal which would be routed directly to the resettable device U202 and also to the second input of gating means U204 thereby eliminating the need of the routing means U205.

The routing means U205 is a counter for counting down the timing source output signal to provide a first signal of a predetermined frequency at a predetermined pulse width and a second signal of a predetermined frequency at a predetermined pulse width. The first signal having the frequency of 30.72KHz is applied to the switching element U202 of the timing means and the second signal developed by U205 is applied to the second input of gating means U204.

The gating means U204 is comprised of three NOR circuits shown in FIG. 4. Pins 1 and 5 of the gating means U204 has applied to it by, means of switches S201 and S202, a selectable signal such as 7.68KHz which has been counted down by U205 from the source signal of 245.76KHz of U203 by a factor of 32. Pins 2 and 6 of U204 has applied to it the output of NOR circuit U204 (pin 10) having its first input (pin 9) connected to a reference ground and its second input (pin 8) connected to the 245.76KHz timing signal. The operation of the gating means U204 having input pins 5 and 6 provides a Noring function of the timing signal of 245.76KHz with a lower timing signal such as 7.68K Hz so as to produce a train of pulses that is periodically gated off at a repetition rate which is applied to one of the pulse transformers T201. The gating means U204 having input pins 1 and 2 provides a compliment of the gating pulses of U204 (pins 5 and 6) to drive the other transformer T202.

Each of the pulse transformers T201 and T202, comprising the pulse transformer network previously discussed with regard to FIG. 6, have a respective transistor Q201 and Q202 which are of an FET device. The transistors Q201 and Q202 are responsive to their respective input signals from the gating means and are connected to their respective pulse transformers for generating the pulsed output signals for controlling the operation of the bridge 400 of FIG. 6. The gating-on of either of the pulse transformers T201 or T202 is accomplished by the gating-off of pulses that feed the other transformer T202 or T201. The frequency of the gating determines the frequency of the lamp current reversals generated by the bridge 400.

The clock oscillator and frequency divider of FIG. 4 may also comprise the two switches S202 and S201 that may be used to operate the lamps at one or two polarities of D.C. regulated current or at either of two selectable frequencies. The top position of S202 shown in FIG. 4 selects a ground potential which results in a regulated D.C. current of a first polarity to be directed to the discharge lamp via the bridge 400. The bottom switch of S202 selects a 12 volt excitation and results in a regulated D.C. current of a second polarity to be directed to the discharge lamp via the bridge 400. The application of a first and a second polarity of regulated current is of importance to the operation of a gas discharge lamp disclosed in the cross-referenced U.S. patent application Ser. No. 157,436. The middle position of S202 is interconnected to the common of switch S201. This second switch wiper arm of S201 may be selected to either a 7.68KHz signal or a 60 Hz gating wave from two binary outputs of the binary counter chain U205. The 7.68KHz gating wave is derived by dividing the timer frequency of 245.76KHz by 32 while the 60 Hz gating signal is derived by dividing the timer frequency by 4096.

The circuit arrangement of FIG. 4 also provides for the means for detecting the level of current flowing in the gas discharge lamp which determines one of the operations of the D.C. to D.C. switching current regulator. The means for providing such protection comprises an analog comparator U201 having at its input pin 3 the sensing resistors R304 of FIG. 5 providing a signal indicative of the current flowing in the discharge lamp and a resistor-capacitor network (R607 and C602) of the instant light current control 600 of FIG. 8.

With reference to FIG. 5, the power switch Q304 is turned on by a clock pulse developed by U202 and turned off by the current measuring comparator U201 of FIG. 4. The switching cycle of the D.C. to D.C. current regulator begins when the clock oscillator U205 delivers a clock pulse to the flip-flop U202 to turn-on the power switch Q304 which, in turn, provides a square-wave of regulated current to the bridge 400, which, in turn, steers this regulated square-wave current to the discharge lamp.

The purpose of the instant light current control 600 of FIG. 8 is to provide for instant light, that is, to provide a level of light during lamp warm-up that is nearly equal to the fully warmed-up level. This level of instant light is of particular importance when the ballast circuit of the present invention is used to operate discharge lamps such as those disclosed in cross-referenced U.S. patent application Ser. Nos. 157,359; 157,360; 157,436 for automotive applications. The instant light current control is a network for establishing and detecting the level of current flowing in the gas discharge lamp. The instant light current control circuit supplies a (decreasing) current reference voltage to the comparator U201 (FIG. 4) during the initial 20 seconds of discharge lamp operation. The comparator U20 is responsive to this signal and causes the lamp current, developed by the D.C. to D.C. current regulator 300 and delivered to the lamp by bridge 400, to track the decreasing reference voltage. The initial lamp regulated current is preferably 4.5 amperes which falls to 0.8 ampere over a span of about 20 seconds of lamp operation.

The initial value of the current reference voltage (and therefore the lamp current) is set by potentiometer, R604, whereas, the run current for the lamp is set by potentiometer, R602. The transition from start to run levels is an exponentially decreasing value as determined by the time constant of the RC network, C601 and R606 located at the input stage (pin 3) of a comparator U601. A control winding on inductor, T301 senses lamp voltage to initiate the start-to-run transition by means of the sensed voltage being transferred by diode D601 to render transistor Q602 conductive, which, in turn, renders transistor Q601 non-conductive. Capacitor, C603 and resistor, R610 provide a network to prevent the circuit of FIG. 8 from prematurely cutting back the initial lamp current during the breakdown phase of lamp starting. The non-conductive Q601 causes the charge stored in the RC network to begin to decay. The output stage of comparator U601 follows this decay and presents this decaying voltage as a reference value to pin 2 of U201 of FIG. 4. A network comprised of Q603, R607 and R608 is preferably connected to the output stage of comparator U601 to hold or clamp the reference voltage applied to pin 2 of U201 at a value not to exceed about 3.0 volts.

The comparator U201 operates to generate an output signal when the difference between the signals applied to the first input (pin 3) and second input (pin 2) exceed a predetermined value. The first input is connected to the resistor R304 which detects the current flowing through the lamp and the second input is connected to the output stage of comparator U601 by means of the RC network R607 and C602. When the voltage present on pin 2 of U201 equals or exceed the voltage present on pin 3 of U201 varying from abut 3.0 volts to about 0.5 volts, the comparator output of U201 changes and applies a signal to pin 4 of U202, which, in turn, inhibits the output signal (30.72KHz) of U202 applied to the switching means transistors Q302 and Q303 of the D.C. to D.C. regulator 300 of FIG. 5, thereby rendering these devices non-conductive and preventing any further square-wave regulated current developed by the D.C. to D.C. current regulator 300 from being applied to the discharge lamp via bridge 400.

It should now be appreciated that the practice of the present invention provides for a synchronized ballast circuit controlled by the clock oscillator and frequency divider of FIG. 4. The D.C. to D.C. switching current regulator under control of the time pulses and feedback and control signal developed by the circuits of FIGS. 4, 5 and 8 provides a D.C. square-wave regulated current that is routed to the current reversing bridge 400 of FIG. 6. The current reversing bridge 400 having its first and second pair of switching means under control of the pulsing signals generated by the circuit of FIG. 4 applies this current regulated square-wave to the discharge lamp in alternate directions. The discharge lamp, in particular, the xenon lamp, metal halide lamp, and xenon metal halide lamp respectively of U.S. applications Ser. Nos. 157,359; 157,360; 157,436; related to present invention require a high voltage starting pulse provided by the circuit shown in FIG. 9.

Figure 9:
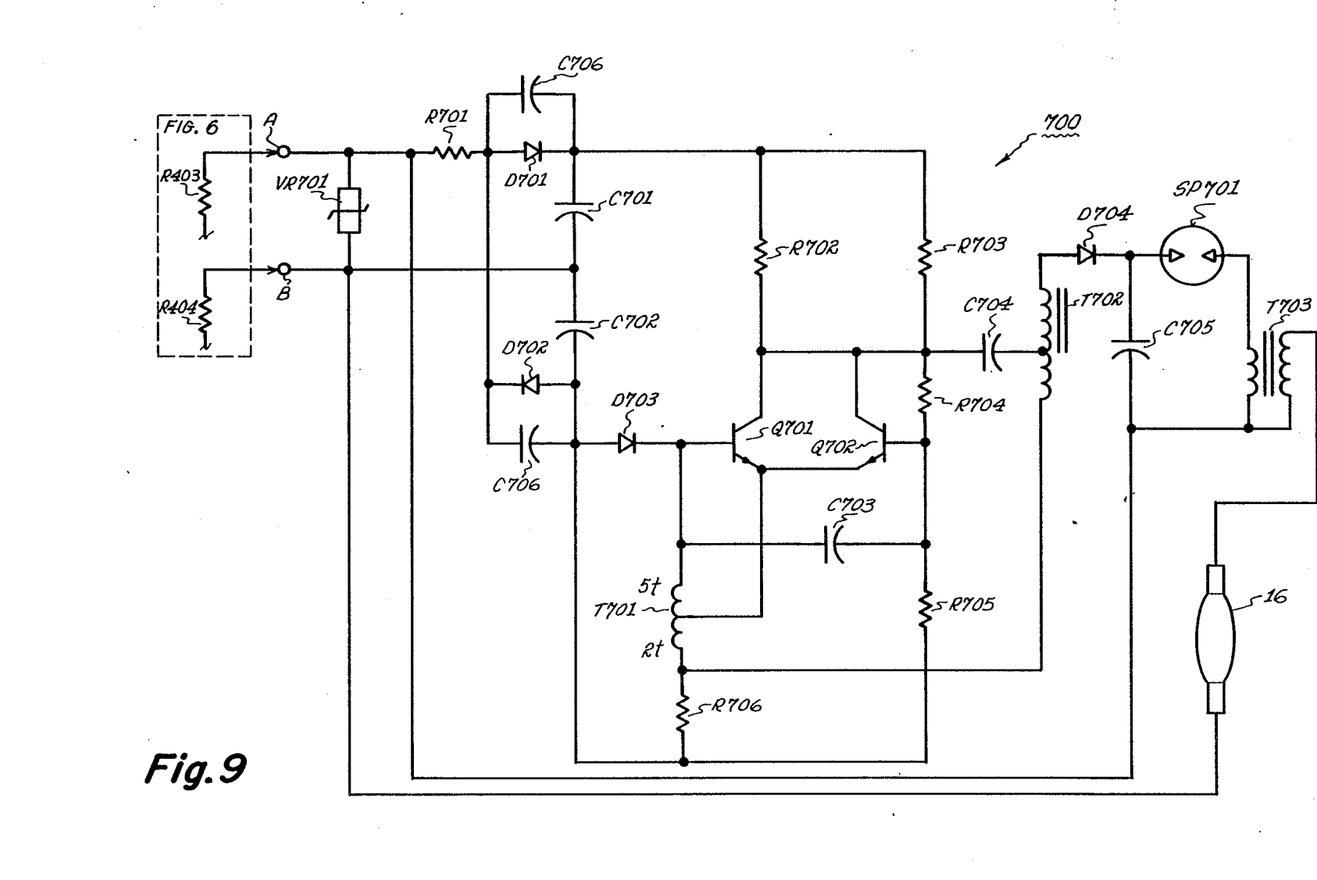
FIG. 9 is a diagram of a starting circuit for various discharge lamps related to the present invention.

The outputs of the current reversing bridge 400 of FIG. 6 supplying the regulated current of D.C. to D.C. regulator 300 in alternate directions to the gas discharge lamp are connected to the terminals designated A and B of the starting circuit of FIG. 9. The starting circuit 700 is comprised of an input charging circuit, an oscillator circuit, various transformers and a spark-gap device. The input to the starter circuit of FIG. 9 is the bridge 400 is nominally a 360 volt peak-to-peak square wave. On the positive half cycle, current flows from the A terminal through R701, D701, C701, and back to the B terminal, charging C701 to 180 volts peak. On the negative half cycle, current flows from the B terminal, through C702, D702, R701, and back to the A terminal, charging C702 to 180 volts peak. Thus, the voltage from the top of C701 to the bottom of C702 is 360 volts D.C. This charging network determines the operation of an oscillator of the starter circuit to be described. This charging action takes place over a range of frequencies that the bridge 400 may be providing for operation of the gas discharge tube. Such a typical frequency is 7.68KHz as previously described.

Capacitors C706 and C707 at the input stage of starter 700 serve to protect diodes D701 and D702 respectively from the large voltage transients that may be generated in later parts of the circuitry. Resistor R701 at the input stage of starter 700 serves two purposes; (1) it limits the charging surge through the diodes (D701 and D702) into the capacitors (C701 and C702); and (2) it decouples the starter power supply so that significant current is not diverted from the arc tube during its run condition.

The high voltage developed by the starting circuit for starting or initializing the ionization condition of the gas discharge is accomplished, in part, by an oscillator comprised of elements Q701, Q702, R703, R704, R705, C703, T701 and D703 disclosed in U.S. Pat. No. 4,350,930 of Peil et al., assigned to the same assignee as the present invention and herein incorporated by reference. This oscillator repetitively discharges energy stored in capacitor C704 through the primary of pulse transformer T702. The high voltage pulses appearing on the output of T702 are rectified by D704 and charge C705. Several pulses generated from T702 charge C705 up to a desired potential for initiating the starting of the gas discharge lamp. Every time the charge on C705 builds up to cause a voltage of approximately 10,000 volts, the spark gap (SP701) breaks down and routes the charge from C705 into the primary of T703. This, in turn, causes about 20,000 volts to appear across the secondary of T703 which is applied to break-down or start the gas discharge lamp.

Specifically, C704 charges from the A terminal of the starter circuit 700 at the top of C701 through R702 and R703, the primary of T702, and R706 back to the B terminal of the starter circuit 700 at the bottom of C702. The Peil et al. circuit of U.S. Pat. No. 4,350,930 is connected so that when Q701 conducts, it discharges C704 into the primary of T702. Nominally, the voltage at the junction of R702 and R703 and C704 attains the full supply of 360 volts of the bridge 700 when C704 charges up. The charging time constant is typically derived from 2,000 ohms of R702 multiplied by the 0.1 uF of C704, or 0.2 milliseconds.

Resistors R704 and R705 form a bias circuit to render conductive or turn-on transistor Q702 when the voltage at the top of R704 is near 360 volts. When Q702 goes into conduction, a current flows through the primary T701 causing a current pulse to be generated in the secondary of T701, turning on Q701, the emitter current of which reinforces the above action, keeping T701 in conduction. This action is maintained until the core of T701 saturates, whereupon such action ceases, and the voltage at the base of Q701 goes negative. This negative swing is clamped to a voltage of approximately 0.7 volts negative by diode D703. Meanwhile the negative pulse is coupled through C703 back to the base of Q702 to insure that it is turned-off or rendered non-conductive. When Q702 and Q701 are off, or non-conductive, C704 is again allowed to charge up. When C704 charges up sufficiently so the voltage approaches 360 volts, Q702 can again turn-on, causing Q701 to turn-on, and again discharging C704. The process repeats with a frequency roughly equal to the reciprocal of the charging time constant of R702-C704 computed hereinbefore as 5KHz.

When the gas discharge lamp breaks-down or starts and goes into conduction, the voltage across it terminals is reduced because it is now a low impedance device, and therefore pulls-down or reduces the voltage at the A and B terminals of the starting circuit 700 to a value below which the oscillator of U.S. Pat. No. 4,350,930 will not oscillate. Thus the starter circuit 700 automatically shuts-off once the gas discharge lamp is started or ignited. However, it is a condition of gas discharge lamp that their terminal voltage does not reduce immediately, especially in A.C. operation where reignition must occur on each half cycle. During the first minute or so of operation, the gas discharge lamp may have a tendency to "drop out" or lose its arc condition, a condition accompanied by an increase in reignition potential during the leading edge of each A.C. half-cycle. Should this occur, the short term pulses occurring across the A and B terminals is sufficient to keep the starter in a ready condition, so that it can immediately produce starting pulses should the arc condition of the gas discharge lamp 16 cease to exist.

T703 of starter 700 may be configured in several ways including but not limited to: (1) a transformer with separate primary and secondary windings having a common connection as shown in FIG. 9; (2) the same as (1) but with no common connection so that the current reversing bridge 400 may be totally isolated from the starting circuit 700, and (3) as an autotransformer similar to T702. However there is a significant difference between the construction of T702 and T703. Transformer T702 is a high turns ratio type, on the order of 200:1, wound with many turns of fine wire, similar to a type popularly known as a photoflash trigger transformer, such as, but not limited to a Mouser Electronics Part No. 42FM901, rated for an input voltage of 300 volts and an output of 10,000 volts.

T703 is constructed with relatively few turns of heavy wire and a minimum amount of inductance. The wire must be sufficiently heavy to carry the full running current for the lamp, and the inductance must be small enough so that the instantaneous starting current is not inhibited. In this application, one preferred implementation consists of an autotransformer configuration having a total of 35 turns of 18 gauge heavy polythermaleze insulated wire close wound on 5/16" I.D.×½" O.D. polyethylene tubing, tapped at 3½ turns, with a ferrite insert.

The operation of the present invention having the D.C. square-wave regulated current directed to the gas discharge lamp substantially reduce or even eliminates the acoustic resonance phenomenon typically experienced a gas discharge lamp such as a metal halide lamp. The use of a D.C. square-wave regulated current eliminates any standing waves in the metal halide lamp by delivering a substantially constant power to the lamp in the form of a square-wave of current. Without the benefits of the present invention almost any inductance above 25 microhenry placed in series with the lamp can corrupt the square-wave by increasing its rise time. The undesired increased rise time results in a periodic power pulsation which may lead to producing standing waves in the metal halide lamp which is a highly undesirable mode of operation. The regulated current developed by the D.C. to D.C. switching current regulator 300 of the present invention is developed across the inductor T1 that remains in series with the metal halide lamp at all times. The inductance of T301 is selected to be below 100 microhenries for a 32 watt gas discharge lamp and is scaled in an inverse portion to the wattage of the metal halide lamp being operated the one ballast circuit of the present invention.

It should now be appreciated that the present invention provides a ballast circuit and a method of operating gas discharge lamps such as those disclosed in the cross-referenced, U.S. patent application Ser. Nos. 157,359; 157,360; and 157,436 that reduces or even substantially eliminating the detrimental cataphoresis and acoustic resonance effects typically experienced during the operation such gas discharge lamps.

Further, the present invention providing a desired method and ballast circuit allows the gas discharge lamps having relatively small dimensions to be employed for automotive headlamps for automotive applications and allow the automotive designers to lower the hood lines of the automobile in a manner as described in the cross-referenced U.S. patent applications Ser. Nos. 157,359; 157,360; and 157,436.

What we claim as new and desire to secure by Letters Patent of the United States is:

1. A method of operating a gas discharge lamp having a pair of electrodes and containing a fill of excitable ingredients comprising the steps of;
   (A) applying a relatively high voltage across said pair of electrodes to cause the excitation of said ingredients;
   (B) delivering a square-wave of current to said pair of electrodes to maintain said excitation of said ingredients, said current being of an amplitude in the range of about 0.2 amperes to about 2.0 amperes and a repetition rate of about once every 1.0 milliseconds to about once every 0.1 millisecond and;
   (C) detecting said level of current delivered to said electrodes and terminating said current if a predetermined value is detected.

2. A method of operating a gas discharge lamp according to claim 1 further comprising;
   (A) alternately changing the direction to which said square-wave of current is delivered to said electrodes on a periodic basis.

3. A method of operating a light source according to claim 1 wherein said relatively high voltage comprises;
   (A) a voltage having an amplitude in the range of about 20,000 volts and a frequency of about 5KHz.

4. A ballast circuit for operating a gas discharge lamp comprising;
   (A) D.C. to D.C. switching current regulator adapted to be connected to a source of D.C. excitation and responsive to (1) means for generating a periodically occurring control signal, and to (2) means for establishing and detecting the level of current flowing in the said gas discharge lamp, said D.C. to D.C. switching current regulator being periodically rendered conductive in response to said periodically occurring control signal so as to generate a D.C. square-wave current, and said D.C. to D.C. switching current regulator being rendered non-conductive in response to a predetermined value of said level of current flowing in said gas discharge lamp; and
   (B) bridge means connected between said D.C. to D.C. switching current regulator and said gas discharge lamp, said bridge means being responsive to said means for generating periodically occurring control signals to steer said current of said D.C. to D.C. switching current regulator in alternate directions through said gas discharge lamp.

5. A ballast circuit according to claim 4 further comprising;
   (A) starting means coupled across said gas discharge lamp and generating a periodically occurring relatively high voltage pulse to initiate and establish excitation of said gas discharge lamp.

6. A ballast circuit according to claim 4 wherein said D.C. excitation is developed by rectification means adapted to be connected to a first and a second A.C. source having respective typical values of 120 volts at 60 Hz and 220 volts at 60 Hz.

7. A ballast circuit according to claim 6 wherein said rectification means further comprises a resistor-capacitor network connected across and filtering D.C. voltages of 180 volts and 360 volts which serve as said D.C. excitation.

8. A ballast circuit according to claim 4 wherein said D.C. excitation is developed by a D.C. to D.C. boost converter connected to a typical D.C. source such as 12 V D.C.

9. A ballast circuit according to claim 4 wherein said D.C. to D.C. switching current regulator comprises;
   (A) switching means connected and responsive to said means for generating said periodically occurring control signals for developing a corresponding output signal; and (B) transistor means connected to one end of a two inductor Tee-section filter having its other end connected to said D.C. excitation, said transistor being rendered conductive in response to said output signal of said switching means and generating said D.C. square-wave regulated current.

10. A ballast circuit according to claim 9 wherein said two inductor Tee-section filter further comprises a capacitor connected across said Tee-section filter to provide in combination with said Tee-section filter a wave trap with a transferred notch function at a fundamental frequency of said D.C. to D.C. switching current regulator, said capacitor and Tee-section filter combination having values selected so as to provide a response that enables the regulated current delivered to said gas discharge lamp to be ramped-up in a time less than 1.0 millisecond.

11. A ballast circuit according to claim 9 wherein said transistor means is further connected to means for detecting the current flowing through said transistor, which, in turn, is indicative of the current flowing through said gas discharge lamp.

12. A ballast circuit according to claim 11 further comprising;
comparator means having a first and a second input, said comparator means generating an output signal when the difference between signals applied to said first and second input means exceeds a predetermined value, said first input being connected to said means for detecting the current flowing through said transistor;
a network for establishing and detecting predetermined values indicative of the current flowing in said gas discharge lamp and which is routed to said second input of said comparator means; and
timing means having a switching element responsive to said output signal of said comparator means and inhibiting said periodically occurring control signal to said D.C. to D.C. switching current regulator.

13. A ballast circuit according to claim 12 wherein said timing means comprises;
(A) free running timing source means generating an output signal at a predetermined frequency and having a predetermined pulse width;
(B) means for routing said timing source output signal to said switching element of said timing means for generating said periodically occurring control signal in response to the absence of said output signal of said comparator means; and
(C) gating means having a first and a second input, said first input being connected to said output signal of said timing source generating an output signal representative of said output signal of said timing source; and
(D) transistor means responsive to said output signal of said gating means and connected to a pulse transformer network for the generating a pulsed output signal to said bridge means representative of said output signal of said timing source.

14. A ballast circuit according to claim 13 wherein said means for routing said timing source output signal comprises;
counter means for counting down said timing source output signal to provide a first signal of a predetermined frequency at a predetermined pulse width and a second signal of a predetermined frequency at a predetermined pulse width, said first signal being applied to said switching means of said timing means and said second signal being applied to said second input of said gating means.

15. A ballast circuit according to claim 13 wherein said transistor means comprises;
(A) a first and a second pair of switching networks and each including a portion of said pulse transformer network responsive to said pulsed output of said pulsed transformer network, said first pair of switching means being rendered conductive and responsive to said pulsed output to steer said current of said D.C. to D.C. switching current regulator in one direction through said gas discharge lamp, and said second pair of switching networks being rendered conductive and responsive to said pulsed output to steer said current of said D.C. to D.C. switching current regulator in another direction through said gas discharge lamp.

16. A ballast circuit according claim 5 wherein said starting means comprises;
(A) an input circuit connected to the output of said bridge means for charging a network to a predetermined voltage;
(B) an oscillator circuit connected to the charging network and rendered conductive so as to oscillate when said predetermined voltage charging of said network is achieved;
(C) a transformer having one end connected to said oscillator circuit and its other end connected to a spark gap device having a predetermined break over voltage; and
(D) said spark gap device having its other end connected to a transformer connected in series to one end of said gas discharge tube which has its other end connected to an output of said bridge means.

* * * * *